United States Patent
Weyand et al.

(12)

(10) Patent No.: US 6,930,785 B1
(45) Date of Patent: *Aug. 16, 2005

(54) AUTOMATIC REMOTE FIRMWARE UPGRADE

(75) Inventors: Chris Weyand, Boise, ID (US); Robert M. Ring, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/527,974

(22) Filed: Mar. 17, 2000

(51) Int. Cl.⁷ ............................................. G06K 15/00

(52) U.S. Cl. ..................... 358/1.1; 358/1.13

(58) Field of Search ................ 358/1.1, 1.11, 1.13, 358/1.15, 1.16, 400, 401, 404, 406; 710/1, 710/8, 10, 11, 12, 15–16, 72

(56) References Cited

U.S. PATENT DOCUMENTS

| | | | |
|---|---|---|---|
| 6,467,087 B1 * | 10/2002 | Yang | 717/168 |
| 6,625,258 B1 * | 9/2003 | Ram et al. | 379/88.13 |
| 2002/0109863 A1 * | 8/2002 | Monroe | 358/400 |

* cited by examiner

Primary Examiner—Arthur G. Evans

(57) ABSTRACT

An imaging system including firmware is disclosed. The imaging system includes a communications device adapted and constructed to facilitate communication between the imaging device and a remote source of information. An automatic remote firmware update mechanism is adapted to selectively and automatically retrieve firmware upgrade information from the remote source of information via the communications device. The automatic remote firmware update mechanism can also selectively and automatically install the firmware upgrade information into the firmware of the imaging system. The automatic remote firmware update mechanism can form a part of firmware installed in the imaging system. The communications device can be provided as a modem, or as a network interface card. The imaging system can also include a flag mechanism for storing a value corresponding to an update trigger parameter. A flag parameter update mechanism can be provided to incrementally increase the update trigger parameter in response to a sensed condition. A trigger mechanism is adapted to actuate the automatic remote firmware update mechanism to automatically retrieve firmware upgrade information when the update trigger parameter reaches a predetermined update value. The sensed condition can be a condition such as page count through the imaging system, or the passage of a predetermined amount of time. The imaging system is also adapted to periodically check the update trigger parameter, and to compare downloaded firmware upgrade information to existing firmware to determine the necessity of installing the downloaded firmware upgrade information. A method of updating firmware is also provided.

33 Claims, 2 Drawing Sheets

AUTOMATIC REMOTE FIRMWARE UPGRADE

FIELD OF THE INVENTION

The present invention relates to firmware associated with imaging systems. More specifically, the present invention relates to upgrading firmware from sources external to the imaging system.

BACKGROUND OF THE INVENTION

Imaging systems such as printers, fax machines, and copiers are virtually omnipresent, and can be found in homes and offices worldwide. The development of such systems has facilitated improvements in communication that have in turn fostered an enormous change in the way people live and work. Telecommuting, paperless offices, and intra-office networks represent but a few examples of the advancements that have been made possible by modern imaging systems.

Some imaging systems, such as the HP LASERJET 8100 by Hewlett-Packard Company, use firmware as part of their operating systems. Firmware gets its name from having characteristics of both hardware and software, and is typically provided as permanent instructions embedded within ROM (read-only memory) chips, such as PROM—Programmable ROM and EPROM—Erasable Programmable ROM.

Over the "life" of an imaging system, it is advantageous to upgrade the system firmware to enhance the functionality of the imaging system. It is known to upgrade firmware using a feature referred to as Remote Firmware Upgrade (RFU), by which upgrades are acquired from sources external to the imaging system, such as web sites or dial-up databases. Known RFU features assume a "push" model requiring proactive participation of the imaging system user. The user can employ a PC to obtain an RFU downloadable image from the imaging system manufacturer's web site, then install the file in the imaging system firmware.

This approach presents a number of difficulties. For example, the push approach is not user-friendly. System users are unlikely to consider imaging system firmware upgrades to be a high priority, resulting in infrequent upgrades if they are remembered at all. The time involved in obtaining and installing an upgrade is considerable, ranging from 15 to 30 minutes. New users are apt to make mistakes in downloading and installing the upgrade. Furthermore, obtaining and storing the RFU downloadable image can create computer problems. The size of the RFU downloadable image can be up to 8 MB which, if left undeleted by the user, takes up valuable disk space. Also, using a PC to first obtain and then install the RFU downloadable image results in redundant network traffic.

The complexity, inconvenience, and potential for error involved in known RFU features present a significant obstacle to making otherwise desirable changes. Consequently, this undeniably useful feature is not being used to its fullest potential in existing system configurations.

It can thus be seen that the need exists for RFU features that ameliorate the disadvantages of those used in known systems.

SUMMARY OF THE INVENTION

These and other objects are achieved by providing an imaging system including firmware. The imaging system includes a communications device adapted and constructed to facilitate communication between the imaging device and a remote source of information. An automatic remote firmware update mechanism is adapted to selectively and automatically retrieve firmware upgrade information from the remote source of information via the communications device. The automatic remote firmware update mechanism can also selectively and automatically install the firmware upgrade information into the firmware of the imaging system.

The automatic remote firmware update mechanism can form a part of firmware installed in the imaging system. The communications device can be provided as a modem adapted to connect to, and access information from, a web site, or as a network interface card, such as an HP JetDirect card, which will connect a printer to a LAN.

The imaging system can also include a flag mechanism for storing a value corresponding to an update trigger parameter. A flag parameter update mechanism can be provided to incrementally increase the update trigger parameter in response to a sensed condition. A trigger mechanism is adapted to actuate the automatic remote firmware update mechanism to automatically retrieve firmware upgrade information when the update trigger parameter reaches a predetermined update value. The sensed condition can be a condition such as page count through the imaging system, or the passage of a predetermined amount of time. The imaging system is also adapted to periodically check the update trigger parameter, and to compare downloaded firmware upgrade information to existing firmware to determine the necessity of installing the downloaded firmware upgrade information.

The imaging system can include a mechanism for notifying a system user when firmware has been upgraded.

A method of updating firmware is also provided in conjunction with an imaging system including firmware, and a communications device adapted and constructed to facilitate communication between the imaging device and a remote source of information. In a first step, firmware upgrade information is selectively and automatically retrieved from the remote source of information via the communications device. Next, the firmware upgrade information is selectively installed into the firmware of the imaging system.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
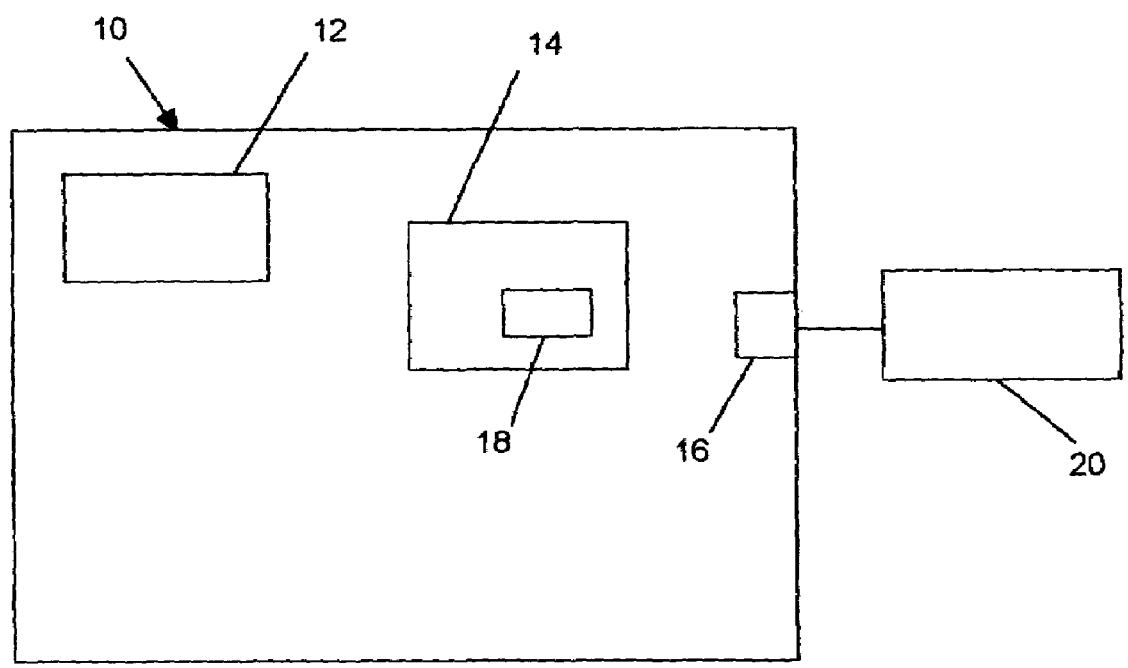
FIG. 1 is a schematic illustration of an imaging system in accordance with the principles of the present invention.

An imaging system 10 in accordance with the principles of the present invention is shown in FIG. 1. The imaging system 10 can be provided, for example, as a printer, copier, or fax machine. The illustrative examples that follow are set in the context of a LASERJET printer manufactured by Hewlett-Packard Company. It will be understood, however, that the principles of the present invention are applicable to any suitable imaging system.

The imaging system 10 includes a control panel 12 which provides a user interface mechanism. The control panel 12 can be, for example, a keyboard or touchscreen as is known in the art. The control panel 12 is connected to imaging system firmware 14, which contains permanent instructions embedded within a ROM chip. The system 10 also includes a communications device 16, which may be provided as a modem or other communications interface. One example of such a device is a JET DIRECT card available from Hewlett-Packard Company.

In accordance with the present invention, the imaging system firmware 14 includes a Remote Firmware Upgrade (RFU) feature 18. The RFU feature 18 is composed of a set of programming instructions, residing in the firmware 14, that allow the RFU feature 18, in conjunction with the operating system of the imaging system 10 and a remote source of information or external data source 20 (external to the imaging system firmware), to automatically obtain firmware upgrades at pre-set intervals.

Figure 2:
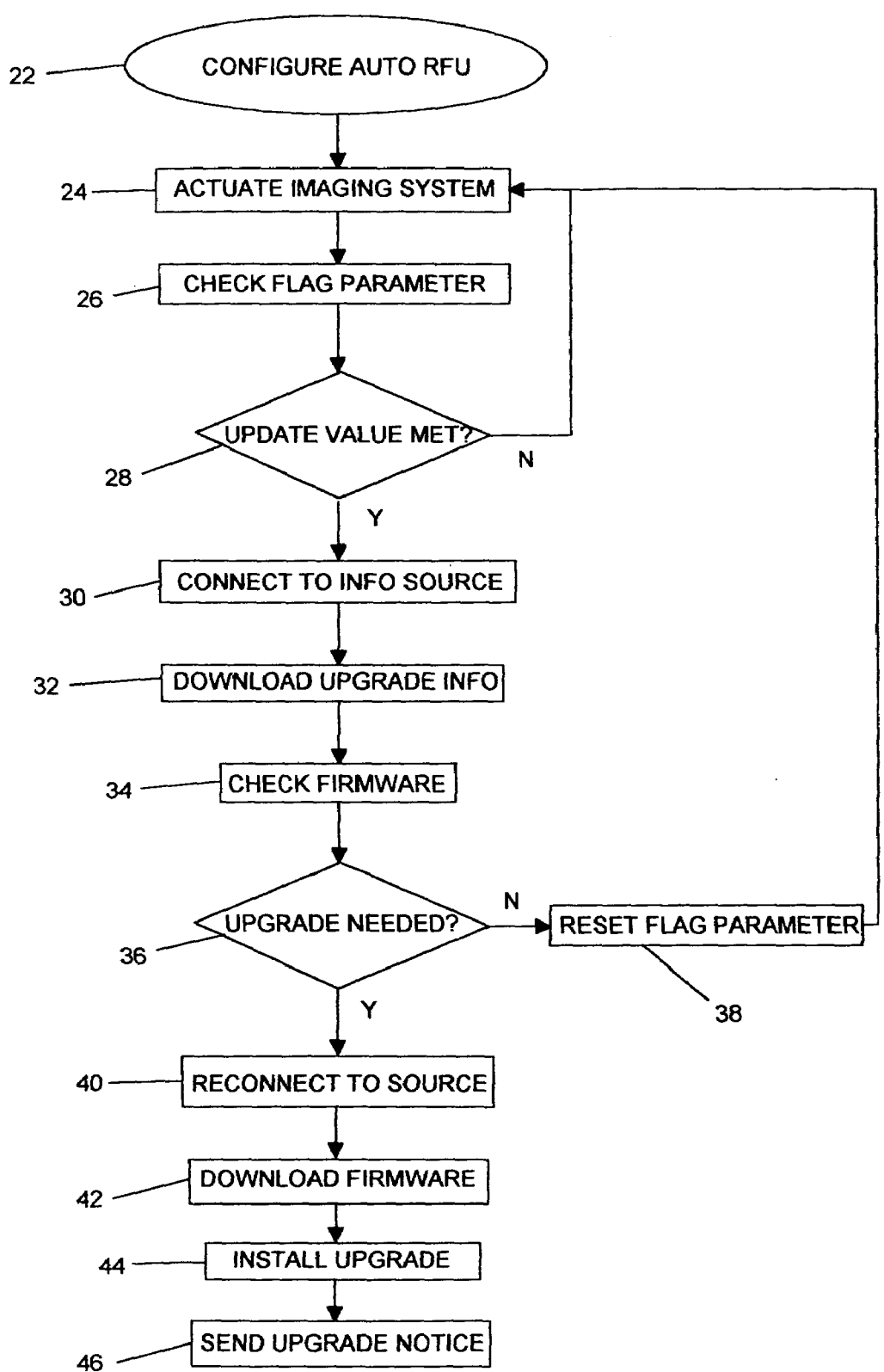
FIG. 2 is a flow chart illustrating the operation of an imaging system including a remote firmware update feature in accordance with the principles of the present invention.

Those of skill in the art will recognize that the specific programming used to achieve the results described herein will become apparent upon appreciation of the operational flow chart set forth in FIG. 2. The remote firmware upgrade process begins at point 22, wherein the imaging system is configured. The imaging system firmware can configure an update value which, when met, acts as a point at which the system should update itself in response to a sensed condition, such as page count or the passage of time. The configuration can be a factory pre-set. Alternatively, the system user can configure the system using the control panel, a PML object, or a PJL variable. It is contemplated that, although the need for updates will vary in different situations, reasonable restrictions should be placed on the update value so that the web site or other information source is not overwhelmed, yet users still get reasonably frequent upgrades.

After the imaging system is actuated at point 24, the firmware checks the update trigger parameter at point 26. As the system operates, a flag parameter update mechanism incrementally increases the update trigger parameter in response to a sensed condition, as described above. At point 28, a flag mechanism is invoked. The flag mechanism compares the update trigger parameter to the update value from the system configuration. If the update trigger parameter does not meet the update value, system status returns to point 24. If the update trigger parameter meets the update value, a trigger mechanism is adapted to actuate the automatic remote firmware update mechanism to automatically connect to the outside source of information at point 30. At point 32, the automatic remote firmware update mechanism retrieves firmware upgrade information. If the information source is a web site, retrieval includes establishing a connection with the web site, then downloading the image file.

The downloaded information is compared to existing firmware at point 34, in order to determine whether or not the upgrade is needed. If the existing firmware is the latest version, the update flag is re-set at point 38, and system status returns to point 24.

If the existing firmware needs to be upgraded, the system reconnects to the information source at point 40, then downloads the firmware at point 42. The upgrade can then be installed at point 44.

It may be desirable to notify the user or system administrator at point 46 that the upgrade has been completed. Alternatively, a notice requesting user permission to install the upgrade could be generated between points 36 and 40.

The advantages over known systems are many and varied. For example, once the system is configured to autoupgrade, users receive the most up-to-date firmware, thus reducing technical support calls and increasing user satisfaction. The possibility of user download error, and the need for user computer space and user time is eliminated. Network traffic is halved, since the firmware upgrade is downloaded directly to the imaging system.

Although the present invention has been described with reference to specific embodiments, those of skill in the art will recognize that changes may be made thereto without departing from the scope and spirit of the invention as defined by the appended claims.

What is claimed is:

1. A printing system comprising the following:

firmware associated with the printing system;

a communications device adapted and constructed to facilitate communication between the printing system and a remote source of information;

an automatic remote firmware update mechanism adapted to selectively and automatically retrieve firmware upgrade information from the remote source of information via the communications device, and to selectively and automatically install the firmware upgrade information into the firmware of the printing system;

wherein the firmware upgrade information comprises information configured to effect at least one operation of a printer of the printing system with respect to the formation of a hard image upon media using the printer;

flag means for storing a value corresponding to an update trigger parameter;

flag parameter update means for incrementally increasing the update trigger parameter in response to a sensed condition; and trigger means for actuating the automatic remote firmware update mechanism to automatically retrieve firmware upgrade information when the update trigger parameter reaches a predetermined update value.

2. A printing system according to claim 1, wherein the automatic remote firmware update mechanism comprises a part of firmware installed in the imaging printing system.

3. A printing system according to claim 1, wherein the communications device is selected from a group consisting of a modem and a network interface card.

4. A printing system according to claim 3, wherein the communication device further comprises means for connecting to, and accessing information from, a web site.

5. A printing system according to claim 1, wherein the flag parameter update means incrementally increases the update trigger parameter value in response to page count through the imaging system.

6. A printing system according to claim 1, wherein the flag parameter update means incrementally increases the update trigger parameter value in response to the passage of a predetermined amount of time.

7. A printing system according to claim 1, further comprising means for periodically checking the update trigger parameter.

8. A printing system according to claim 1, further comprising means for comparing downloaded firmware upgrade information to existing firmware to determine the necessity of installing the downloaded firmware upgrade information.

9. A printing system according to claim 1, further comprising means for notifying a system user when firmware is to be upgraded.

10. In a printing system including firmware and a communications device adapted and constructed to facilitate communication between the imaging device and a remote source of information, a method of updating firmware comprising the following:
   selectively and automatically retrieving firmware upgrade information from the remote source of information via the communications device;
   selectively installing the firmware upgrade information into the firmware of a printer of the printing system;
   storing a value corresponding to an update trigger parameter;
   sensing a condition;
   incrementally increasing the update trigger parameter in response to the sensed condition; and
   actuating the automatic remote firmware update mechanism to automatically retrieve firmware upgrade information when the update trigger parameter reaches a predetermined update value.

11. A method according to claim 10, wherein retrieving firmware upgrade information comprises retrieving firmware upgrade information from a web site.

12. A method according to claim 10, wherein sensing a condition comprises sensing page count through the imaging printing system, and the step of incrementally increasing the update trigger parameter comprises incrementally increasing the update trigger parameter value in response to page count through the imaging system.

13. A method according to claim 10, wherein sensing a condition comprises sensing the passage of time, and the step of incrementally increasing the update trigger parameter comprises incrementally increasing the update trigger parameter value in response to the passage of a predetermined amount of time.

14. A method according to claim 10, further comprising periodically checking the update trigger parameter.

15. A method according to claim 10, further comprising comparing downloaded firmware upgrade information to existing firmware to determine the necessity of installing the downloaded firmware upgrade information.

16. A method according to claim 10, further comprising notifying a system user when firmware has been upgraded.

17. A printer comprising the following:
   firmware installed in the printer;
   a communications device adapted and constructed to facilitate communication between the printer and a remote device containing firmware upgrade information; and
   an automatic remote firmware update mechanism adapted to sense a condition of the printer, to selectively and automatically retrieve firmware upgrade information from the remote device via the communications device responsive to the sensed condition comprising a defined state, and to selectively and automatically install the firmware upgrade information into the firmware of the printer.

18. A printer according to claim 17, wherein the automatic remote firmware update mechanism is adapted to selectively and automatically download firmware update image files from the remote device.

19. A printer according to claim 17, further comprising:
   a print engine configured to print hard images upon media; and
   a housing configured to at least partially house the firmware, the print engine and the automatic firmware update mechanism.

20. An apparatus comprising:
   a printer configured to form hard images upon sheets of media;
   wherein the printer comprises:
      initial firmware provided at a first moment in time, and wherein the initial firmware is accessed to implement operations of the printer with respect to the formation of hard images upon the sheets of media using the printer;
      a communications device adapted to communicate with a source located externally of the printer; and
      circuitry coupled with the communications device and configured to initiate communication with the source to automatically request and access additional firmware from the source at a second moment in time after the first moment in time using the communications device and to render the additional firmware accessible within the printer to implement operations of the printer with respect to the formation of hard images upon the sheets of media using the printer.

21. The apparatus of claim 20 wherein the additional firmware updates the initial firmware.

22. The apparatus of claim 20 wherein the additional firmware replaces at least a portion of the initial firmware.

23. The apparatus of claim 20 wherein the additional firmware comprises firmware in addition to the initial firmware.

24. The apparatus of claim 20 wherein the second moment in time is after deployment of the printer by a user.

25. The apparatus of claim 20 wherein the circuitry is configured to render the additional firmware accessible without user input.

26. The apparatus of claim 20 wherein the circuitry comprises an automatic remote firmware update mechanism.

27. The apparatus of claim 20 wherein the printer further comprises:
   a print engine configured to form the hard images upon the sheets of media; and
   a housing configured to at least partially house the initial firmware, the additional firmware, the communications device, the circuitry and the print engine.

28. A printer according to claim 17 wherein the sensed condition of the printer comprises a page count, and the defined state comprises the page count reaching a defined number.

29. A printer according to claim 17 wherein the sensed condition of the printer comprises a passage of time, and the defined state comprises the passage of time reaching a defined duration.

30. A printer according to claim 17 wherein the automatic remote firmware update mechanism is configured to retrieve the firmware upgrade information directly from the remote device comprising an originating source of the firmware upgrade information.

31. The apparatus of claim 20 wherein the circuitry is configured to initiate the communication with the source responsive to a page count of the printer reaching a defined number.

32. The apparatus of claim 20 wherein the circuitry is configured to initiate the communication with the source responsive to a passage of a defined amount of time.

33. The apparatus of claim 20 wherein the circuitry is configured to access the additional firmware directly from the source comprising an originating source of the additional firmware.

\* \* \* \* \*